United States Patent Office 3,448,680
Patented June 10, 1969

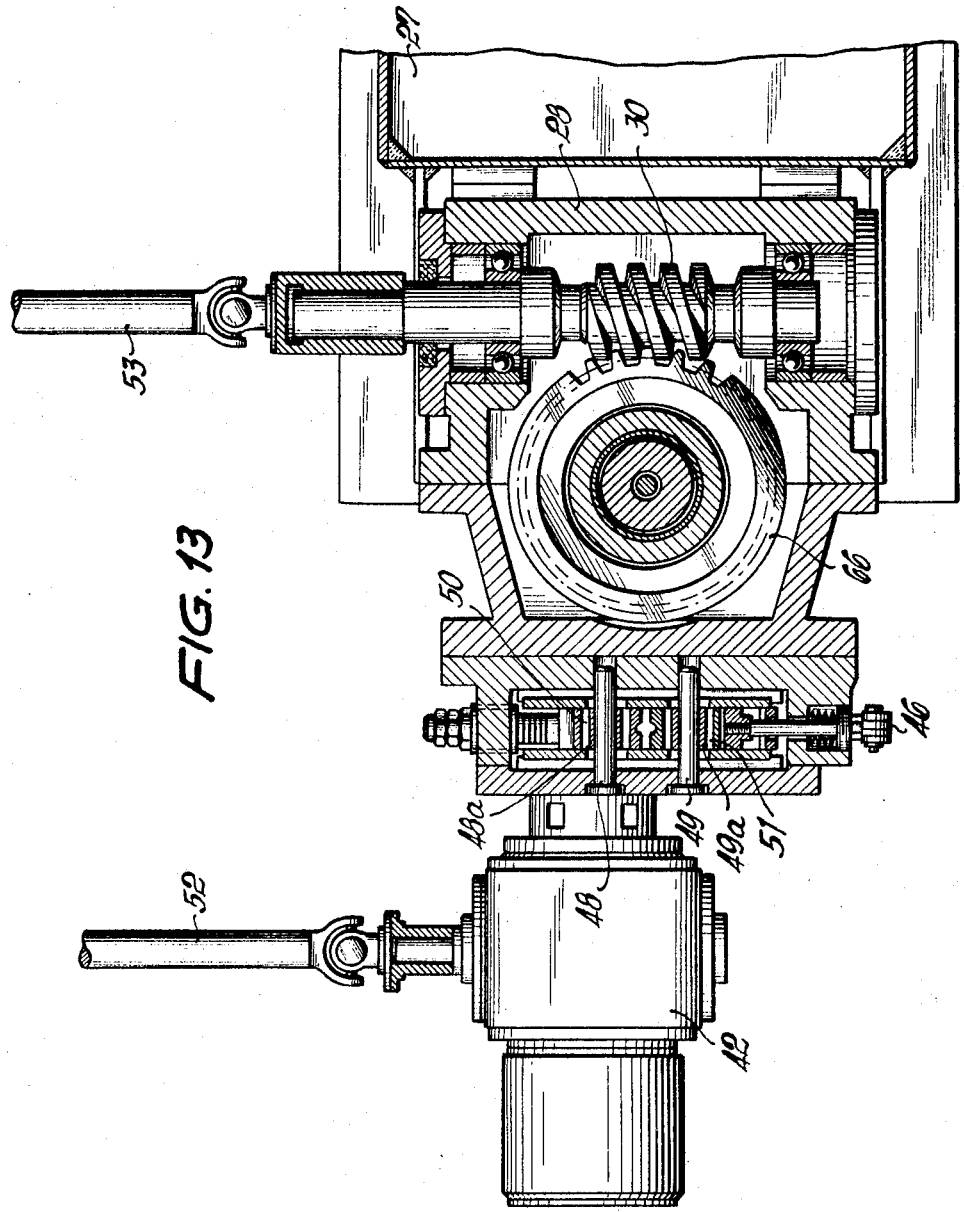

3,448,680
AUTOMATIC TYING DEVICE
Hans Weber, Duisburg-Buchholz, Germany, assignor to
Demag Aktiengesellschaft, Duisburg, Germany
Filed June 3, 1966, Ser. No. 555,066
Claims priority, application Germany, June 5, 1965,
D 47,454
Int. Cl. B65b *13/04*
U.S. Cl. 100—10                                    16 Claims

ABSTRACT OF THE DISCLOSURE

A device for tying a coiled wire stack includes a movable frame with means on the frame for compressing and holding the stack and for causing two sets of gripper arms to be directed to engage a tying wire to move it upwardly from the outside of the stack on at least two diametrically opposite locations to effect transfer from one set of gripper arms to corresponding opposite ones on the inside of the stack and to further effect downward movement of the tying wire to completely encompass the stack. Means are associated with the frame for feeding the tying wire upwardly into association with the gripper arms and for twisting and cutting the wire after it has been moved around the stack.

Summary of the invention

This invention relates in general to automatic tying devices for materials such as coiled wire, and to a new and useful device for compressing a bundle of material such as wire while a tying wire is fed around the bundle at at least one circumferential location, and to means for effecting the cutting and twisting of the tying wire to cause tight engagement of the bundle.

The present invention deals with an apparatus which provides means for tying bundles of annularly stacked materials such as wire which is delivered to the tying station such as by a mechanism which effects the delivery in a stepwise manner. Prior to the present invention, it has been known to guide the tying wire in guide troughs or channels which surround a cross sectional leg of the annular bundles. However, it has been demonstrated that this method is not practically feasible because the tying wire cannot be moved or guided on a relatively long path without the tying wire becoming corrugated and tangled. This phenomenon increases when bundles are relatively high in relation to the bundle cross sectional width.

Another method of tying which has heretofore been practiced has been to provide pre-formed tying wires which are subsequently twisted. Such a method requires equipment for bending the prefabricated wires and also requires special supplying arrangements to effect the placing of the wires over the bundles in a satisfactory manner. A basic disadvantage of this method is that a large variety of different tying wires has to be kept in stock to accommodate the various dimensions of bundles which may be handled. Attempts have also been made to provide means for feeding wires around the bundles for effecting the tying thereof, but such machines have been limited to the tying of small bundles and have not been satisfactory for tying bundles weighing several tons, for example. A further disadvantage with such machines is that the tying wire must be inserted anew at the location of the bundle to be tied and has to be deflected about 90°. These devices are only acceptable for the tying of wires wherein the width ratio of the bundle cross section is about 1:1 and the end line is larger than the height of the bundle. The principal disadvantage of the machines of the prior art, however, is that the tying wire has to be deflected some six times in order to effect the tying and this, of course, causes great stress and the wear of the wire or band so that only wires or bands of high grade material can be used.

Other tying machines have disadvantages in respect to the feed of the wire for tying purposes which is apt to cause the entanglement of the wire and still others have disadvantages in respect to the very narrow tolerances which must be maintained during operation. Generally speaking, the known devices are too complicated to be practically feasible for the tying particularly of large bundles of a wire of a type which may be produced, for example, right in the rolling mills. In addition, such machines are very expensive and relatively slow-operating.

In accordance with the present invention there is provided a machine which is particularly suitable for operating on heavy annular bundles such as a coiled wire bundle which is relatively high. The machine includes means for directing a tying wire around the bundle cross section from one or more locations and for effecting the cutting of the wire after it is looped around one cross-sectional leg. The ends are joined tightly such as by the twisting of the tying wire to tightly engage the bundle after the bundle has been compressed by the machine. A machine of this nature overcomes the drawbacks of the prior art in respect to operational safety and easy use particularly for the tying of large weight bundles of relatively high stacking.

In accordance with the invention a stack or bundle of coiled wire which is to be tied is placed at a tying station and then compressed. A tying wire is then fed to one side of the bundle, for example, the outside or the inside of the coil, at several locations around its diameter. In the preferred arrangement, the feeding of the wire is made at several places around the circumference so that the tying may be applied at several locations at the same time. The leading ends of the tying wires are then drawn longitudinally upwardly (or sidewardly or downwardly, if preferred) to a location slightly above the full height of the bundle to be tied and then the ends are directed across the top (or the end or bottom) of the reels of wire and then downwardly on an opposite side (inside or outside as the case may be). The fed wire is then cut and the ends of the wire are then held together adjacent one end of the stacked wire and drawn together and twisted until the wire tightly embraces around the wire stack.

An advantage of the inventive device is that the wire does not have to be subjected to any preliminary working steps and only a single twisting area is provided for the wire. This arrangement may be employed for bundles of the largest sizes. The tying wire may be of reduced quality and may be taken from a bundle of the goods of reduced quality which is to be tied, for example. The tying time required for effecting the operation from the winding table up to the finished tying is very short. The inventive procedure is therefore very economical and assures good operational safety. The feature of the arrangement is that the bundle may be tied at many locations around its circumference at the same time. The wire ends are twisted to tightly engage them around the bundle.

The device for carrying out the invention includes a machine which may be positioned to overlie a wire bundle and which advantageously includes a frame which is vertically displaceable in order to compress the bundle stack which is to be tied. The frame also advantageously carries a plurality of sets of cooperating gripper arms which are mounted for swinging movement and which may be shifted with the frame along the complete length of the bundle to be stacked. The arms are constructed such that they may easily receive wire which is fed from a feeding device located at one end of the bundle and to move the wire along the length of the bundle to be tied as the wire is being fed. At the opposite end, the gripper arms are shifted so that the wire is transferred from one arm to the other. The machine frame is then moved backwardly along the length of the wire in an opposite direction to cause the arm which has received the wire to move the wire back downwardly around the opposite side of the bundle, for example the inside. At this location, the fed wire is cut and the ends of the wire are moved into association with a twisting bar.

A further feature of the invention is that the gripper elements which are provided for engaging the tying wire include clamping plates which are mounted so that they may be rotated. The clamping plates include diametric grooves or cutouts for receiving the wire and they are rotatable by means of springs to a predetermined starting position. The construction of the gripper members and the clamping elements is such that the wires are moved during each stage of the operation in a manner such that they need not be twisted so that they will not be subjected to great stress. The gripper members include separable jaw members which may be pressed together through the action of a power drive mechanism. Thus, the ends of the tying wire may be easily engaged after they are directed through the gap formed between the jaws. The power drive includes a double wedge member which is movable between the clamping jaws for the purposes of separating them or permitting their movement together. The wedges advantageously moved by a hydraulically or pneumatically charged piston engine so that it may be easily accommodated within the interior of the gripper arm. Because the gripper arms are carried in a manner such that they are pivotally movable and may be arranged one within the interior of the bundle and one on the outside thereof, the arms are always in position for carrying out a desirable function in respect to the tying wire. When the first arm brings the wire upwardly, or to one end of the bundle, the other arm will be at the same location, that is, at this end, for receiving the wire and then directing it downwardly and around to the starting end. When it arrives at the starting end, since the two arms are carried on the same frame, the opposite arm will be in a position for engaging the wire before it is cut so that both ends may be engaged by the opposed gripper arms to position them in the twisting member. In some instances it is desirable to provide one gripper arm of shorter length than the other or to have this gripper arm perform a shorter stroke than the other arm. This will be dependent on the apparatus for effecting the twisting which may be, for example, located adjacent the inner side of the bundle rather than centrally below the bundle.

A further object of the invention is the provision of the twisting mechanism which includes a rotatable set of clamping jaws which is mounted in a manner permitting its axial yielding as the twisting is carried forth in order to accommodate for the shortening of the wire as the twisting takes place. For this purpose, the drive of the twisting device is accomplished through an induction coupling. The coupling shuts off the twisting drive after completed operation and also serves as a signal for the restoring of the gripper arm into the rest position.

A further feature of the invention is the construction of the feed device which includes means for feeding the wire centrally between roller members past alignment jaws which can be shifted by means of a lever system. The original introduction of the leading end of the tying wire which is directed off the tying wire drum through the rod system may thus be actuated manually by solenoids or the like, or also automatically.

Accordingly, it is an object of the invention to provide an improved device for tying bundles of wire which includes a frame member carrying at least one set of grippers, the frame member being reciprocable in respect to the axis of the bundle to be tied for the purpose of directing tying wire first along one side of the bundle by engagement with one gripper arm and then the transfer of the wire to the other gripper arm for bringing the wire backwardly along the opposite side of the bundle cross-section, and including twisting means located on the first end of the bundle for receiving the two ends of the wire from the gripper arms for effecting the twisting thereof.

A further object of the invention is to provide a tying device which includes means for gripping and feeding wire along one end of a bundle to be tied, means for compressing the bundle and for directing wire from the feeding end around the far end of the bundle and back to the feeding end of the tying wire and for thereafter cutting the wire and twisting the two ends located adjacent the feeding end to tighten the wire around the bundle.

A further object of the invention is to provide a gripper mechanism for facilitating the movement of tying wire which includes means for maintaining the wire in a straightened condition for transfer from one gripper member to another.

A further object of the invention is to provide a feeding mechanism for feeding wire to be tied around an annular bundle of material and including a twisting mechanism for engaging the ends of the wire after it is fed around the material for the purpose of twisting the ends.

A further object of the invention is to provide a tying device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 13 is a sectional view taken along the line 13—13 of FIG. 11.

Figure 1:
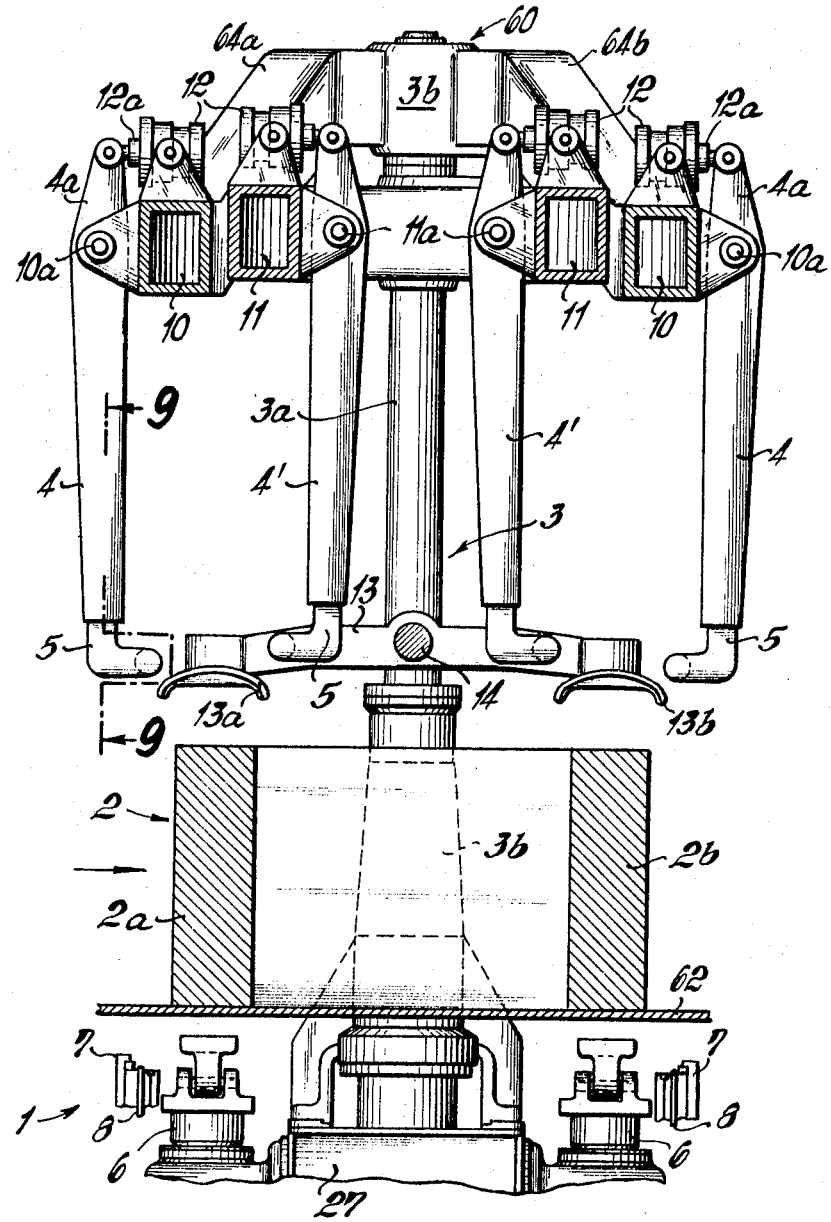
FIG. 1 is a partial transverse sectional view of a wire bundle tying machine constructed in accordance with the invention.

Referring to the drawings in particular, the invention embodied therein comprises a wire tying device generally designated 60 which is arranged alongside a table 62 to operate on a bundle of material such as a coiled bundle of wire 2 which is positioned on the table. The wire tying device 60 includes a bundle tying machine or portion generally designated 3 and a tying wire feeding and twisting machine or portion generally designated 1. The tying machine portion 3 includes a central frame member or column 3b which extends up from the machine feeding and tying wire twisting mechanism 1 and which supports an axially shiftable piston member or column 3a. A piston member 3a carries a yoke portion 3c which carries a plurality of radially extending mounting arms 64a, 64b, 64c, etc. The two mounting arms which are shown in FIG. 1, that is, 64a, 64b, are arranged diametrically opposite and in some instances they may constitute all of the arms which are provided on the tying machine. The arms 64a and 64b include mounting portions 10 and 11 which carry bracket elements 10a and 11a upon which gripper arm members or movable tying members 4 and 4' are mounted.

The tying members 4 and 4' are pivoted on the associated brackets 10a and 11a and they include short end portions 4a which are connected to a piston member 12a of a fluid piston system or machine 12 provided for controlling the pivotal movement of the arms 4.

During the operation of the machine, tying wire 8 is fed upwardly into association with cutting means 7 which is effective to cut the wire into a length sufficient to encircle one of the leg portions of the cross section of the bundle 2 which have been designated 2a and 2b. Each gripper arm 4, 4' carries a gripper device or wire engaging arm portion 5 for engagement with the wire 8 during one portion of the operation of encircling the respective leg portion 2a or 2b and for joining the ends of the wire such as by permitting them to be twisted together. When the wires are to be twisted, a twisting device 6 located as part of the feeding and twisting mechanism 1 is provided to engage a free end and a cut end of the wire after it is directed around the far end of the bundle of wire (in this instance, the upper end) and cut by cutting mechanism 7. The two ends are clamped for the purpose of rotating these ends to effect the twisting and tightening of the wire around the bundle.

The feeding and tying mechanism 1 is shown in detail in FIGS. 11 to 13 and, in the embodiment illustrated in the drawings, it is arranged below the table 62 which carries the bundle 2 of wire.

The typing machine 3 is operated by a suitable control (not shown) to actuate a hydraulic cylinder within the pedestal portion 3b for the purpose of shifting the column 3a. A member 13 is mounted on a guide rod or extension 14 which moves upwardly and downwardly independently of the column 3a as seen in the two positions indicated in FIGS. 1, 2 and 3 and the intermediate position of the column 3a indicated in FIG. 8. The carrier member 13 includes two half portions having curved compressing plates or shoe members 13a and 13b which are adapted to engage the respective ends or tops of the sectional leg portions 2a and 2b of the wire bundle 2. It should be appreciated that there may be a plurality of shoes 13a, 13b for engaging the tops of the bundles 2 at various angularly spaced locations around the annular ends formed by the bundle. The shoes 13a and 13b which will be compressed downwardly on the edges of the bundles are formed with a groove shape to correspond to the profile of the tying wire.

Figure 9:
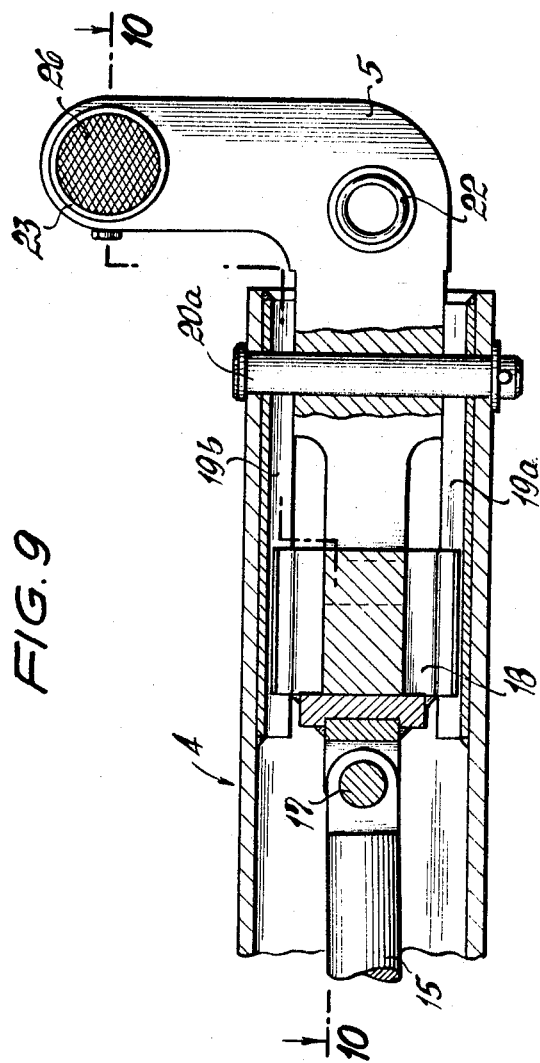
FIG. 9 is an enlarged fragmentary sectional view taken on the line 9—9 of FIG. 1.
Figure 10:
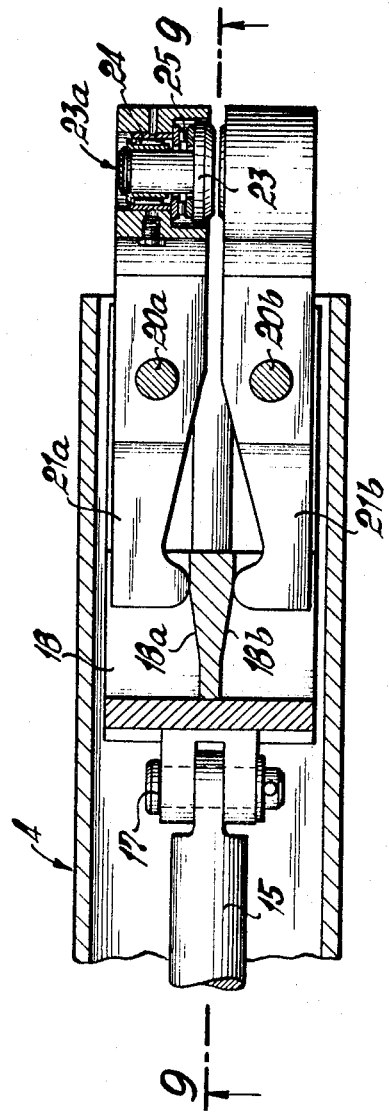
FIG. 10 is a section taken on the line 10—10 of FIG. 9.

The gripper arms 4 are shown in detail in FIGS. 9 and 10 and they are of tubular construction and accommodate in their interior a piston rod 15 which is connected to a piston (not shown) of a fluid piston drive engine or member (not shown). The end of the piston 15 is pivotally connected to a slide member 18 having a double wedge portion 18a and 18b. The slide portion 18 slides in guides 19a and 19b arranged on opposite sides of the interior of the arm 4 and the double wedges 18a and 18b are arranged centrally within clamping jaws 21 and 21b. The clamping jaw members 21a and 21b are pivotally mounted at 20a and 20b to the arm 4. Engagement of the clamping jaw members 21a and 21b is maintained by means of a compression spring 22. Each clamping jaw includes a rotatably mounted clamping plate generally designated 23 (one of which is shown in FIG. 10). Each clamping plate 23 is rotatably mounted in roll bearings 24 and axial bearings 25. Each plate 23 is provided with a knurling or diametrical groove 26 and includes a pin 23a which may be extended and may carry a spring in the form of a leg having one leg which is bent and supported in a bore at the respective clamping jaw 21 while the other leg is supported in a radial bore at the pin 23a. The clamping jaws 23 may be rotated to provide access for the tying wire which may be engaged by the clamping jaws and held in position for the movement of the wire along with the arms 4.

Figure 11:
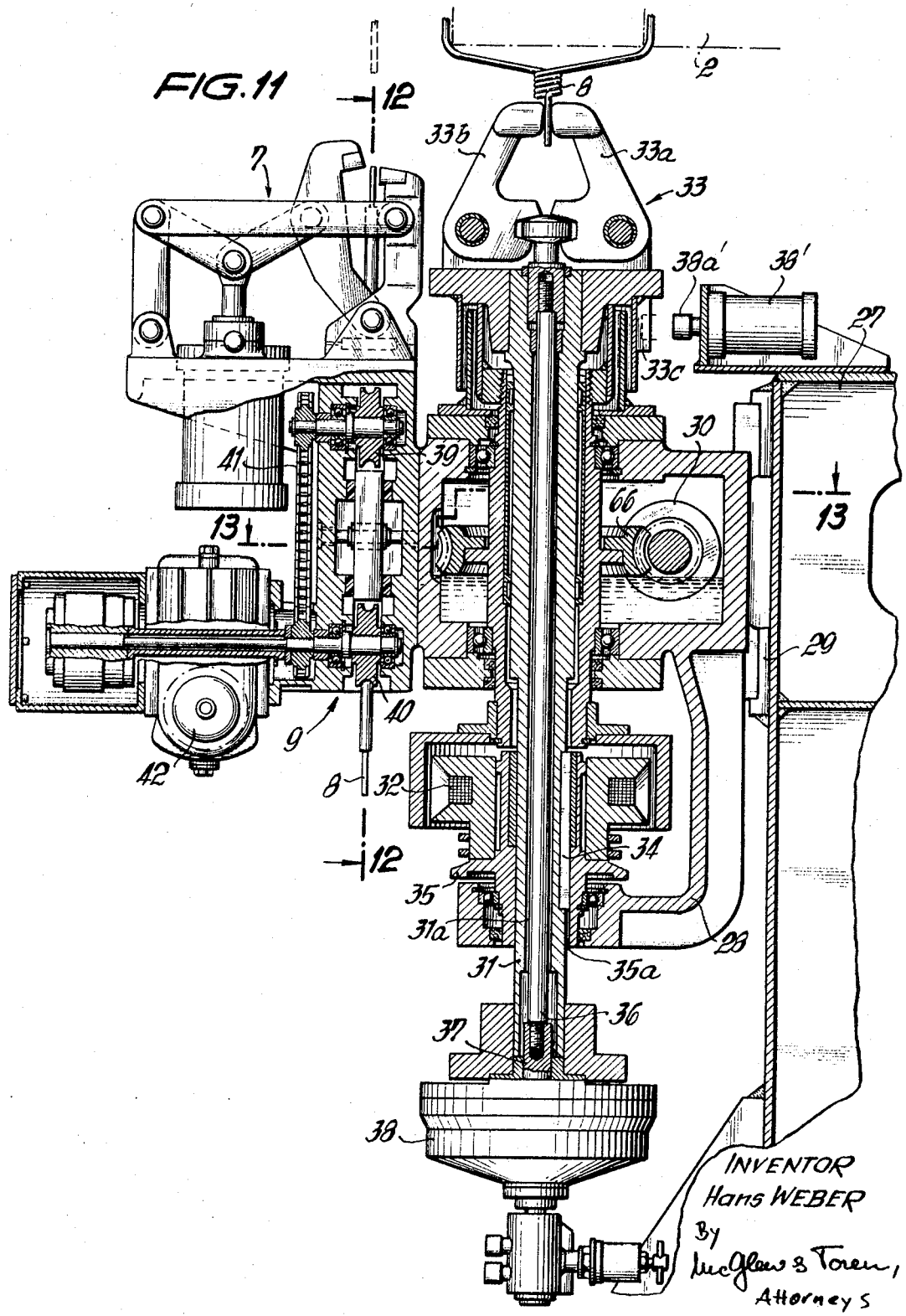
FIG. 11 is a partial transverse sectional view of the feeding and twisting mechanism for the tying device which is partially indicated at the bottom of FIG. 1.
Figure 12:
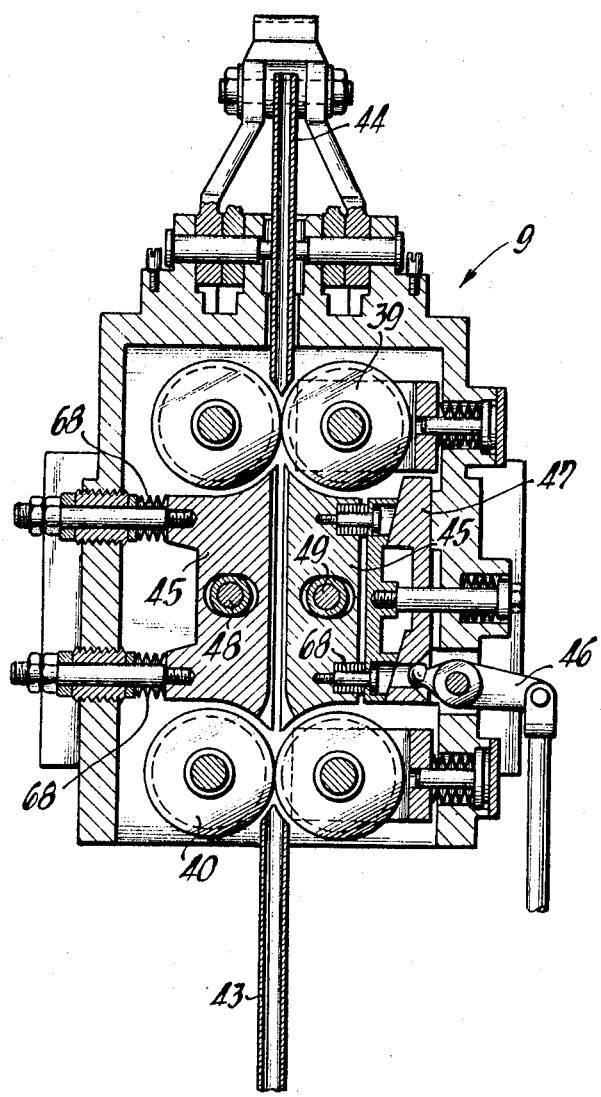
FIG. 12 is a sectional view taken along the line 12—12 of FIG. 11.

The feeding, tying and twisting mechanism 1, as indicated in FIGS. 11 to 13, includes a central housing 27 in whose interior the units for the hydraulic cylinder 3b are accommodated. Directly adjacent the cylinder 27, there is located the mechanism for twisting of the tying wire 8 which includes a casing 28 which is slidable in a guide 29 in directions parallel to the axis of the bundle. The casing 28 contains a worm drive 30 which is driven through a universal joint from a driving shaft 53 (FIG. 13). The worm 30 rotates a worm wheel 66 carried on a sleeve member which forms the outer coupling element of an induction coupling 32 (FIG. 11), the inner coupling being axially displaceable in order to permit the twisting head 33 which is carried on the interior hollow shaft member 31 to yield in the direction of the axis of the bundle when the tying wire becomes shorter during the twisting procedure. This axial mobility is made possible by means of a spline 34 which is guided in a spline groove 35a of the bearing portion 35 for the induction coupling. The hollow twisting spindle 31 includes a central bore 31a for receiving a connecting rod 36 which connects the reciprocable stroke piston rod or rod member 37 with the twisting jaws 33a and 33b. Fluid piston means comprising a cylinder 38 and piston 37 which includes a portion (not shown) which is movable in the cylinder 38 is provided for moving the twisting head 33 upwardly and downwardly.

During clamping of the tying wire 8 a piston 38a' movable in a fluid pressure operated cylinder 38' is directed outwardly to engage into a recess 33c of the twisting head 33 and hold it in a fixed position for this phase of the tying operation.

As also seen in FIG. 11, below a cutting device generally designated 7 for the feed wire 8, there is located a feed mechanism which is generally designated 9. The feed mechanism 9 includes two drive roller pairs 39 and 40 which are rotated through a chain drive 41. The chain drive 41 is connected to a gearing or transmission 42 which is driven from a power or drive shaft 52 as indicated in FIG. 13. The tying wire 8 is guided by means of alignment jaw pairs 45 as shown in FIG. 12 from a supply tube 43 upwardly to a discharge tube 44. The jaw pairs 45 are adjustably situated between the roller sets 39 and 40 and the wire can be fixed by means of the alignment jaw pair. For this purpose, a lever transmission 46 is provided which includes a wedge member 47 which may be shifted in order to change the bearing engagement of the wedge members in respect to the wire which is being fed. The wedge members 45, 45 are also loaded by the springs 68.

As indicated in FIG. 13, guide pins 48 and 49 permit lateral movability of the alignment jaw pair 45 and provide, together with guide bushings 48a and 49a, play in the movement direction. The bushings 48a and 49a are arranged in oblong recesses 50 and 51, respectively.

The operation of the machine is carried out with respect to the tying stages as indicated in FIGS. 1 to 8 as follows:

After the bundle 2 is arranged on a table 62 between the tying machine portion 3 and the feeding, cutting and twisting mechanism 1, the rod 14 is lowered to cause the tensioning plates 13a and 13b to engage the bundle 2. This lowering of the column 3a may be effected, for example, by a photocell control (not shown). During this time, the feeding device 9 initiates the feeding of the tying wire 8.

Figure 2:
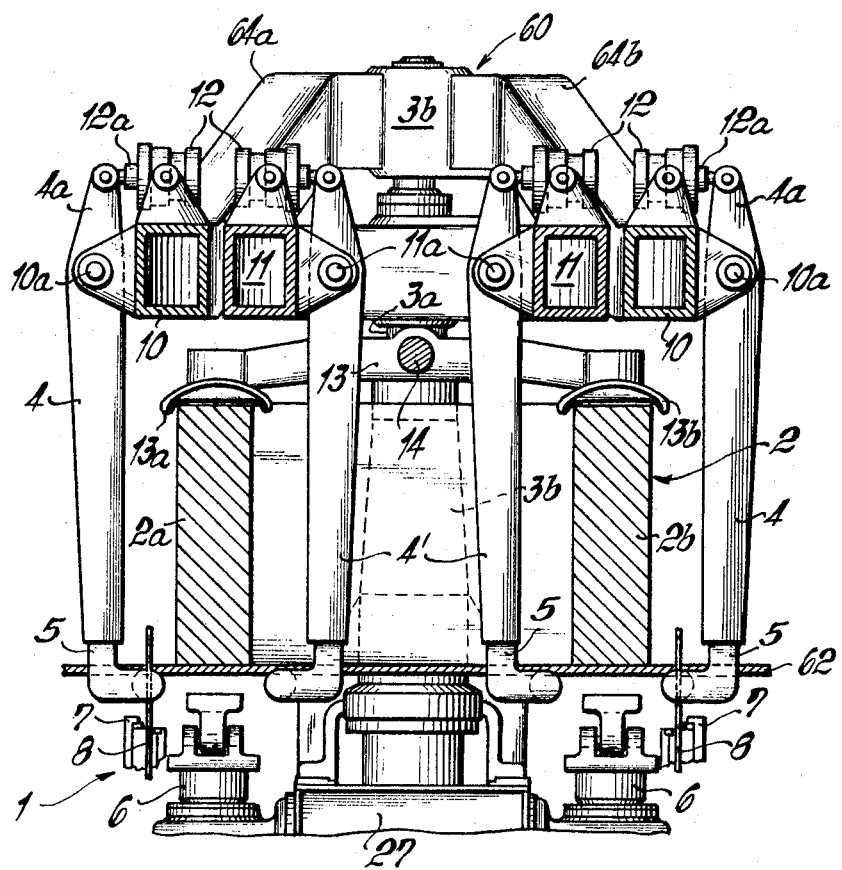
FIGS. 2 to 8 are views similar to FIG. 1 indicating the parts of the machine in the various stages of operation of tying a bundle of wire.
Figure 3:
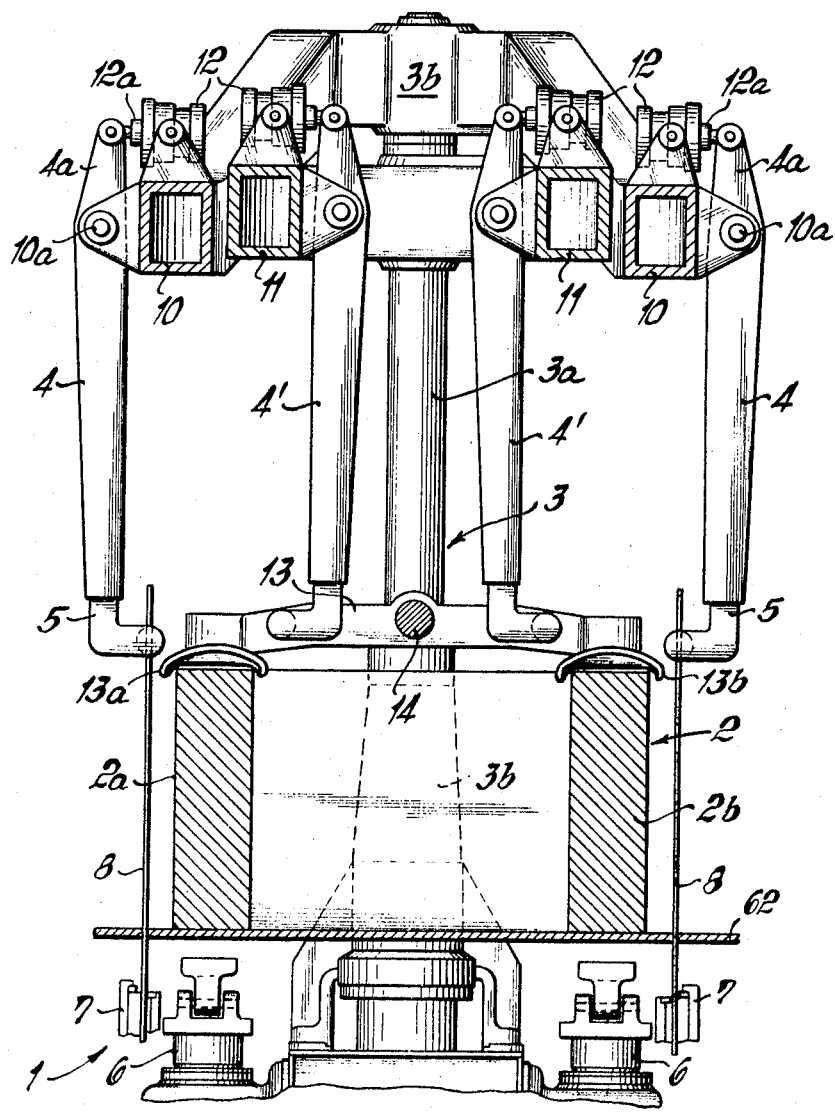
Figure 4:
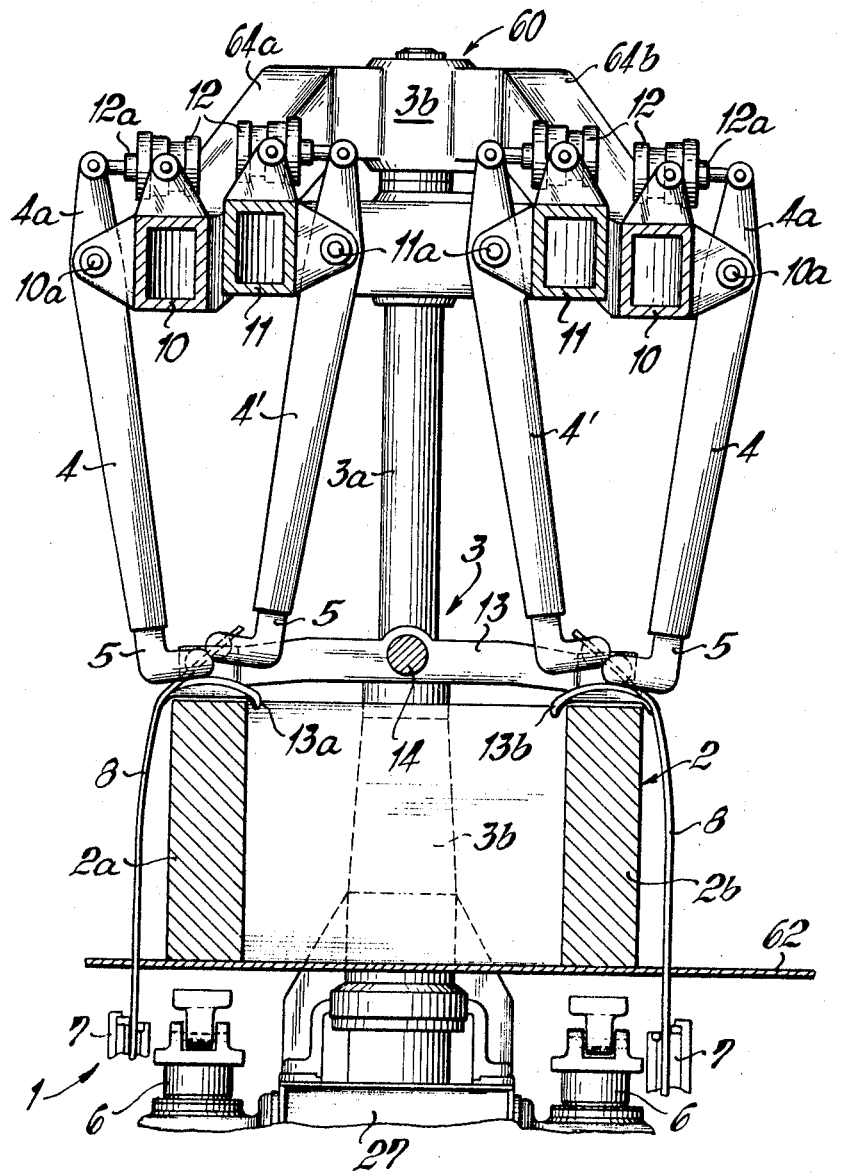
Figure 5:
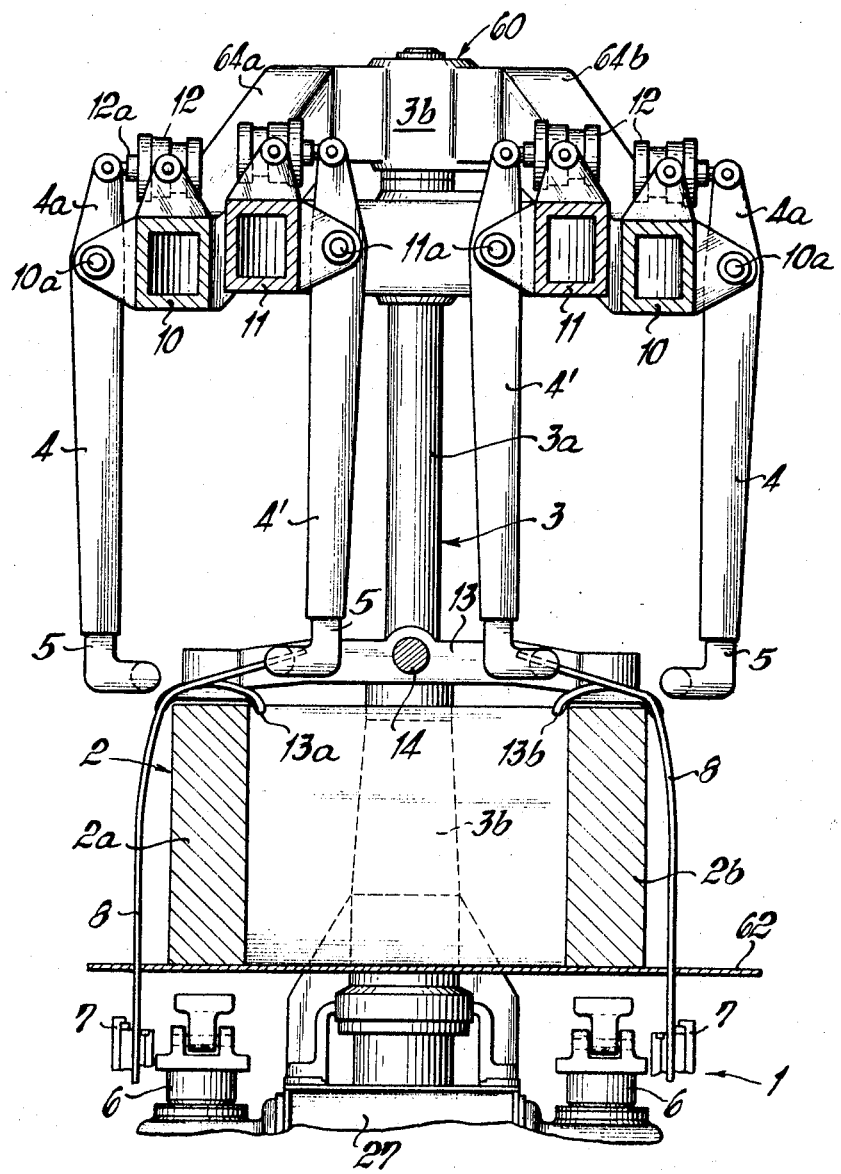
Figure 6:
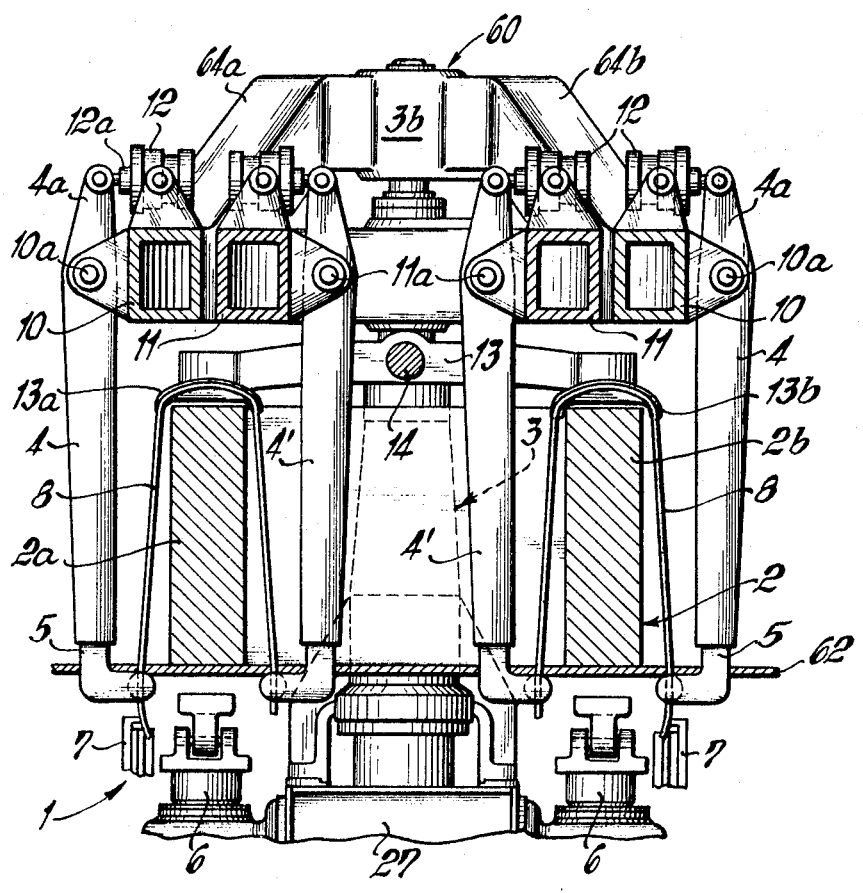
Figure 7:
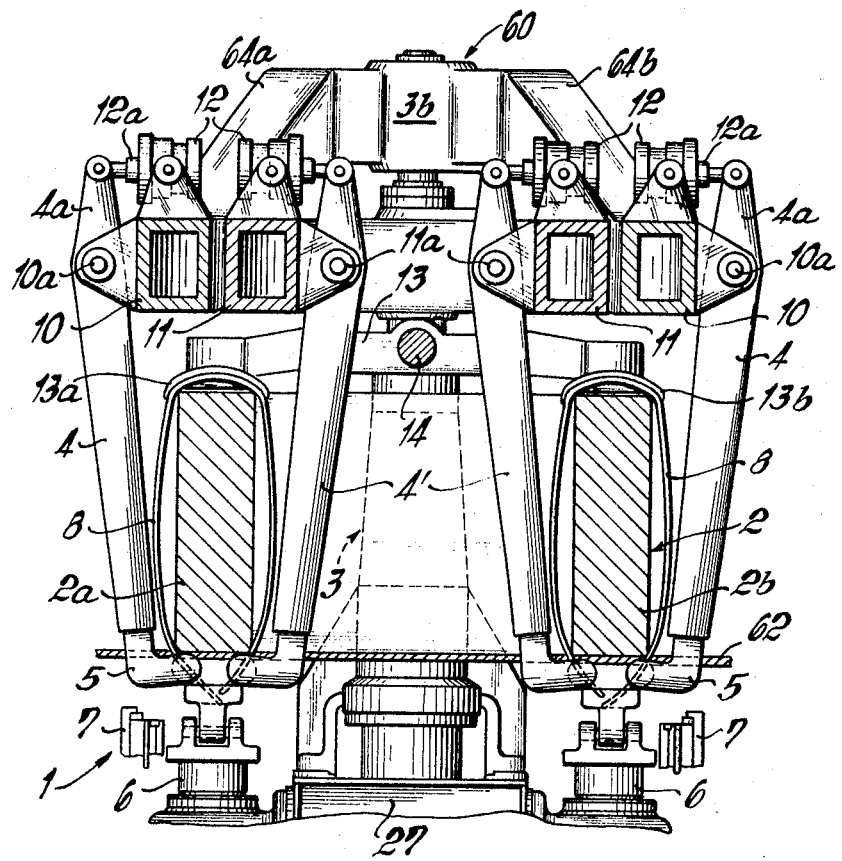

As indicated in FIG. 2, the wire 8 is directed upwardly through a groove 26 of the clamping plates 23 of the clamping assemblies 5. The piston drive means which is connected to the piston 15 as indicated in FIGS. 9 and 10 then cause the clamping jaws 21a and 21b of the arms 4 to tightly engage the wire 8 so that it may be moved upwardly with the outer clamping arm 4 when the column 3a is moved upwardly again to the position indicated in FIG. 3a. During this upward movement, the wire 8 is drawn upwardly beyond the top or far end of the bundle 2. This upward movement to the position indicated in FIG. 3 is carried out with the feed device 9 out of engagement with the wire and the cutting device 7 opened. The opposing gripping arm 4 carried on the bracket portions 11 will also be brought to a position in alignment with the tying wire 8. Thereupon the fluid motor drives 12 are actuated to shift the arms 4 carried by the respective brackets 10 and 11 toward each other as indicated in FIG. 4. The gripper arm 4 which operates at the interior of the bundle is advantageously slightly offset relative to the outer gripper arm. The shifting of the arms 4 also causes the tying wire 8 to be automatically rocked by the closed clamping plates 23 to position the ends of the wires so that they may be easily engaged in the groove for clamping the wire on the respective arms 4' of the bracket 11. The arm 4 is then actuated so that its gripper 5 releases the wire 8 and the arm 4' of the bracket 11 directs the wire around the end of the bundle 2 and backwardly on the other side, that is, the interior of the bundle. This is effected by lowering of the column 3a so that the wire is shifted from the position indicated in FIG. 5 to the position indicated in FIG. 6. Depending on the design of the plates 13a and 13b, there is sometimes provided mechanisms for shifting them so that the tying wire 18 can pass through to engage around the bundle 2. In this movement procedure, as seen in FIG. 7, the opposing gripper arms 4 are rocked by the driving piston engines 12 toward each other and thus tying wire ends are directed by the clamping members 5 into the twisting device 6.

Figure 8:
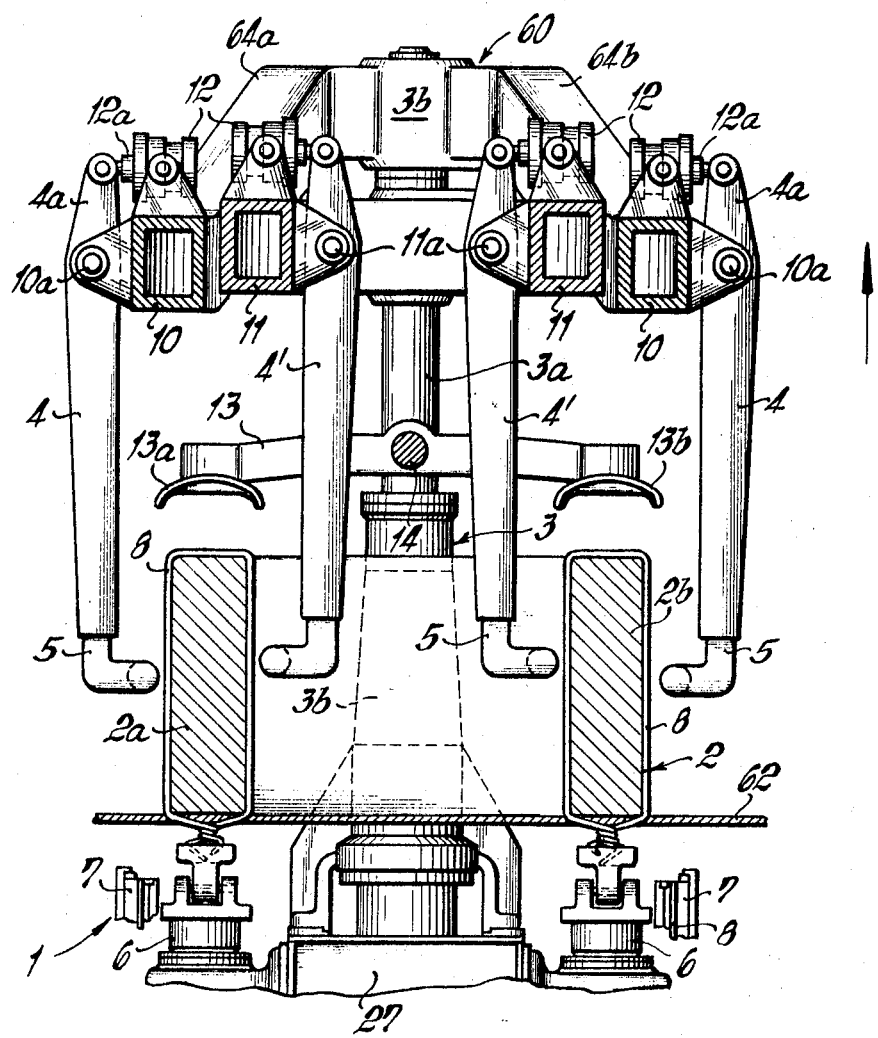

The feeding, tying and twisting mechanism 1 is then operated by suitable controls (not shown) to close the clamping jaws 33a and 33b over the ends of the wire. During this period, the clamping jaws 23 of the gripper member 5 open and the piston drive means 12 swing the arms to the starting position as indicated in FIG. 8. At the same time, the column 3a moves upwardly and the tensioning stirrups 13b are lifted off the end of the wire bundle 12. During the lifting of the column 3a, the twisting stops and the coupling which limits the twisting movement switches (see FIG. 11). When the clamping jaws 33a and 33b are opened, the twisting mechanism may move downwardly to the starting position. After the twisting has stopped, the bundle which has been tied may then be removed from the device and a new bundle placed in position for tying. Of course, in the preferred arrangement the bundle is tied at several locations at the same time.

What is claimed is:

1. A device for directing wire around an annular bundle such as a bundle of coiled wire, comprising means for supporting a bundle of wire to be tied, a movable frame member including at least one set of first and second gripper arms movably mounted on said frame member and being spaced apart for alignment with respective interior and exterior sides of the bundle to be tied and being movable toward and away from each other, said frame member being movable axially with said first and second gripper arms in respect to said bundle, means for feeding a length of tying wire to one end of said bundle, means for moving said frame to position said first and second gripper arms adjacent said one end of said bundle with said first arm having clamping means in alignment with the free end of said tying wire and engageable therewith, means for shifting said frame member with said arms to the opposite end of said bundle and correspondingly to move the tying wire which is clamped in one of said arms to said opposite end, means for moving said arms together and to align the clamping means of said first arm with said second arm and to cause engagement of said tying wire by said second arm and release of said tying wire by said first arm, means for again reciprocating said frame to said one end of said bundle to direct said wire around the far end and to said one end, means for cutting said wire, said arms being engageable with the free end and cut end of said wire to move said ends together around said bundle.

2. A device according to claim 1, including a twisting member, said arms being movable to dispose the free end and cut end of said wires in said twisting member, and means to rotate said twisting member to twist the ends of said wire around said bundle.

3. A device according to claim 2, wherein said twisting member includes spaced jaw members, means for moving said jaw members together to clampingly engage the free end and cut end of said wire, and said means for rotating said twisting member including yielding clutch means permitting axial movement of said twisting member upon the twisting of said wire to tighten the wire around said bundle.

4. A device according to claim 1, including at least one other set of first and second arms pivotally mounted on said frame at a location to overlie the bundle of wire at a circumferentially spaced location from the first set.

5. A device according to claim 4, wherein each of said arms is pivotally mounted on a frame member, and fluid piston means connected to one end of each of said arms for pivoting said arms to shift said arms transversely in respect to the axis of the bundle to be tied.

6. A device according to claim 1, wherein said first and second arms include gripper means comprising a slide member, a reciprocable rod member connected to said slide member for shifting said slide member, said slide member being slideably mounted within said pivotal arm, a pair of clamping jaws pivotally mounted on said arm and being pivotally movable together for enclosing and gripping a wire and apart for releasing a wire, and wedge means connected to said slide member and movable thereby between said clamping jaws for opening and closing said clamping jaws.

7. A device according to claim 6, wherein said clamping means includes rotatable clamping plates, said clamping plates being rotatable to engage the wire without twisting the wire.

8. A device according to claim 1, wherein said tying wire feeding means include spaced roller means for feeding wire to one end of said bundle to be tied, and clamping jaw means disposed between said roller means for clamping the wire to stop feeding thereof, and lever wedge means connected to said clamping jaw means for shifting said clamping jaw means for regulating the clamping engagement of said wire during feeding thereof.

9. A device according to claim 1, wherein said means for joining the free end and cut end includes first and second pivotal jaw members engageable with said free end and said cut end of the wire, means rotatably mounting said jaw members for rotation about a central axis therebetween, and means permitting axial movement of said members in respect to the axis of said bundle during rotation thereof about an axis parallel to said bundle.

10. A device according to claim 9, wherein said gripper arm members each includes a clamping plate having a diametrically extending groove defined therein for engaging said wire, said clamping plates being rotatable into a predetermined starting position by spring means.

11. A device according to claim 1, wherein said means to move said frame includes a fluid cylinder member and a piston member slideable in said cylinder.

12. A device according to claim 11, including gripper members associated with said clamping plates for compressively engaging said wire.

13. A device according to claim 1, wherein said means to pivot said arms includes a pneumatically actuable piston drive means.

14. A device according to claim 1, wherein said gripper arm members include angled off end portions which extend toward each other.

15. A device according to claim 1, including means for supporting said bundle so that its axis extends vertically, said frame member being reciprocable vertically for shifting said first and second arm members in respect to said bundle.

16. A device according to claim 1, including presser means adapted to be moved downwardly to engage an end of the bundle to be tied and to compress it against the means supporting said bundle.

References Cited

UNITED STATES PATENTS

| | | | |
|---|---|---|---|
| 1,261,589 | 4/1918 | Mogan et al. | 100—10 |
| 1,412,098 | 4/1922 | Anthony | 100—12 XR |
| 1,417,329 | 5/1922 | Jones | 100—10 |
| 2,901,966 | 9/1959 | Bocher | 100—12 |
| 2,972,294 | 2/1961 | Lecocq | 100—10 |
| 3,263,597 | 8/1966 | Stychinsky et al. | 100—10 |
| 3,304,960 | 2/1967 | Keusemann et al. | 100—10 XR |

FOREIGN PATENTS

| | | |
|---|---|---|
| 615,650 | 2/1961 | Canada. |
| 110,981 | 5/1964 | Czechoslovakia. |
| 1,098,884 | 3/1955 | France. |
| 1,355,475 | 2/1964 | France. |
| 1,150,311 | 6/1963 | Germany. |

BILLY J. WILHITE, *Primary Examiner.*

U.S. Cl. X.R

100—12, 31